US007636795B2

(12) United States Patent
Hess et al.

(10) Patent No.: US 7,636,795 B2
(45) Date of Patent: Dec. 22, 2009

(54) CONFIGURABLE FEATURE SELECTION MECHANISM

(75) Inventors: Gary M. Hess, Cameron Park, CA (US); Robert W. Strong, Folsom, CA (US); Jeffrey T. Brown, Roseville, CA (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/883,518

(22) Filed: Jun. 30, 2004

(65) Prior Publication Data

US 2006/0004928 A1    Jan. 5, 2006

(51) Int. Cl.
*G06F 3/00* (2006.01)
(52) U.S. Cl. .................. 710/8; 710/10; 710/14
(58) Field of Classification Search .......... 710/8, 710/10, 14
See application file for complete search history.

(56) References Cited

U.S. PATENT DOCUMENTS

| 5,023,907 | A | 6/1991 | Johnson et al. | |
|---|---|---|---|---|
| 5,666,411 | A | 9/1997 | McCarty | |
| 7,046,997 | B2 * | 5/2006 | Bahr | 455/418 |
| 2002/0108053 | A1 | 8/2002 | Kashiwada | |
| 2002/0133471 | A1 * | 9/2002 | Eskandari et al. | 705/401 |
| 2003/0160992 | A1 * | 8/2003 | Weaver | 358/1.14 |
| 2004/0236852 | A1 * | 11/2004 | Birkestrand et al. | 709/226 |
| 2005/0018604 | A1 * | 1/2005 | Dropps et al. | 370/229 |
| 2005/0154511 | A1 * | 7/2005 | Proefke et al. | 701/30 |
| 2006/0259318 | A1 * | 11/2006 | Walker et al. | 705/1 |

FOREIGN PATENT DOCUMENTS

| EP | 0365200 | B1 | | 9/1996 |
|---|---|---|---|---|
| EP | 001392052 | A1 | * | 2/2004 |
| EP | 1015981 | B1 | | 3/2004 |
| EP | 2006/005006 | A2 | | 1/2006 |

OTHER PUBLICATIONS

International Search Report mailed Feb. 8, 2006, 6 pages.
Written Opinion of the International Searching Authority, 6 pages.
Sandhu R.S. et al, "Access Control: Principles and Practice". IEEE Communications Magazine, IEEE Service Center. NY NY, USA. vol. 32, No. 9. Sep. 1994.
PCT Written Opinion for PCT Appln No. US2005/023540, mailed Jan. 18, 2007 (6 pages).
Written Opinion of the International Searching Authority, 6 pages. Aug. 2, 2006.
Sandhu R.S. et al, "Access Control: Principles and Practice". IEEE Communications Magazine, IEEE Service Center. NY NY, USA. vol. 32, No. 9. Sep. 1994.
International Preliminary Report on Patentability received for PCT Application No. PCT/US2005/023540 mailed on Jan. 18, 2007; 8 pages.

* cited by examiner

*Primary Examiner*—Alford W Kindred
*Assistant Examiner*—David E Martinez
(74) *Attorney, Agent, or Firm*—Derek J. Reynolds (57) ABSTRACT

A method, apparatus, and system are disclosed. In one embodiment the method comprises determining whether a feature on a device is permitted to be enabled, determining whether a total number of enabled features on the device is less than or equal to a maximum number of allowable features on the device, and allowing the enabling of the device feature if the device feature is permitted to be enabled and the total number of enabled features on the device is less than or equal to the maximum number of allowable features on the device.

8 Claims, 8 Drawing Sheets

FIG. 1

| CIRCUITRY INPUT/OUTPUT KEY | | |
|---|---|---|
| Number | Name | Notes |
| 202 | Function Disable | 0=enable, 1=disable |
| 204 | Feature Permission Designator | 1=selected, 0=deselected |
| 206 | Feature Enable Register | 1=enable, 0=disable |
| 214 | Feature Selection Mechanism | 0=enable, 1=disable |

FIG. 2

CIRCUITRY INPUT/OUTPUT KEY

| Number | Name | Notes |
|---|---|---|
| 302 | Function Disable | 0=enable, 1=disable |
| 304 | Feature Permission Designator | 1=selected, 0=deselected |
| 306 | Feature Enable Register | 1=enable, 0=disable |
| 316 | Feature Selection Mechanism | 0=enable, 1=disable |

CONFIGURABLE FEATURE SELECTION MECHANISM

FIELD OF THE INVENTION

The invention relates to programming and selecting features on a device.

BACKGROUND OF THE INVENTION

Inventory forecasting, inventory management, and stock keeping units (SKUs) management costs are a significant burden to a large hardware technology company. A hardware company's ability to fulfill customer desires for individual features and feature combinations for each piece of hardware manufactured is restricted by manufacturing limitations on the number of hardware SKUs the company can support. For example, chipsets usually have many possible feature combinations and each combination currently requires a separate hardware SKU. Customers must maintain multiple boards for each of these unique hardware SKUs of the chipset. This also forces customers to maintain a unique motherboard line item and to manage inventories for each distinct SKU of the chipset. Additional hardware SKUs carry an associated financial burden and contribute to inventory management risk and complexity. Hardware companies are currently unable to support multiple alternative configurable features on a single physical hardware SKU. Thus, it would be beneficial to have a single physical hardware SKU that could support multiple alternative configurable features. This would allow a hardware company to capture the value attributed with those features and combinations that could not be supported using the existing SKU methods due to cost or inventory complexity limitations.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of an effective configurable feature selection mechanism are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
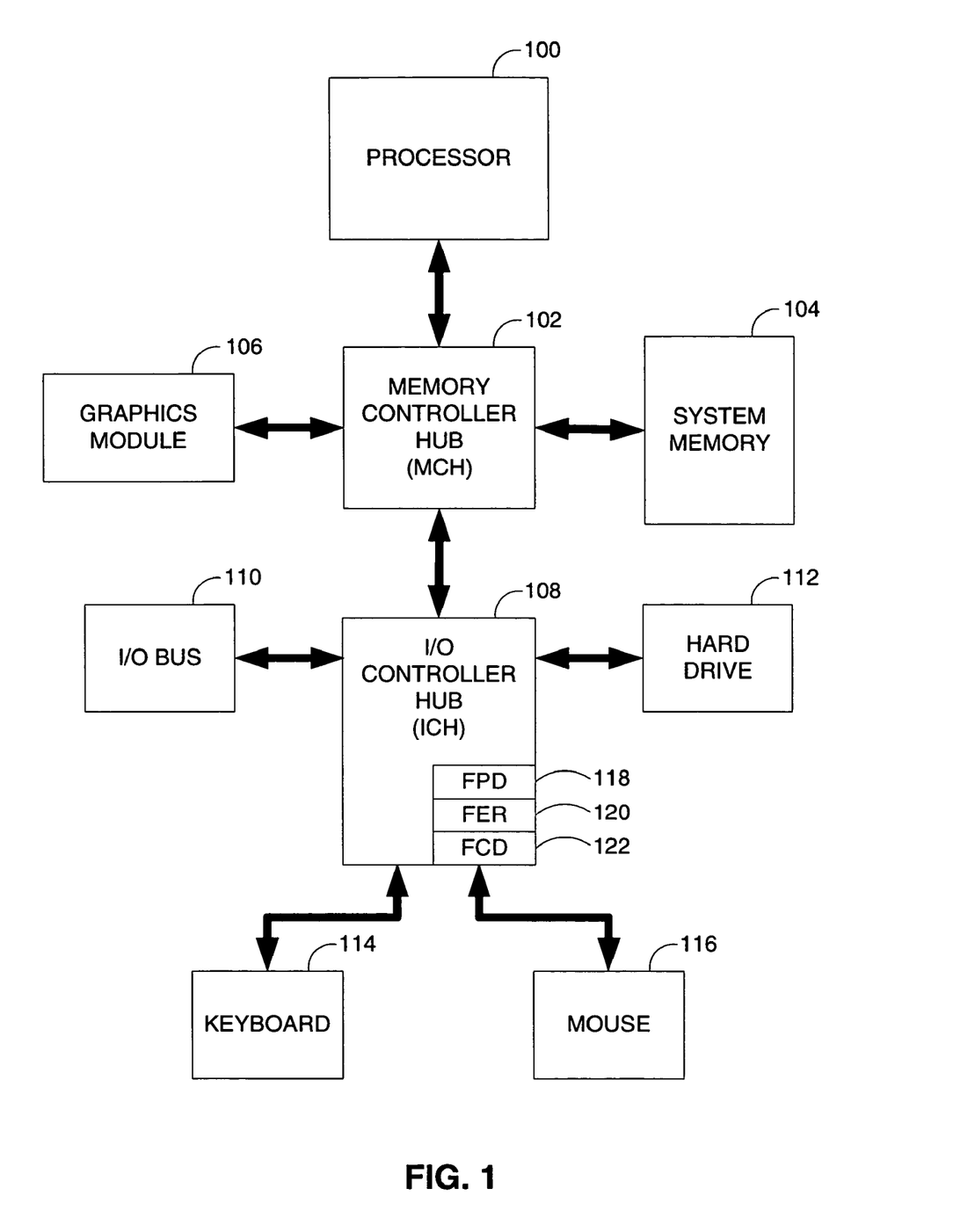
FIG. 1 is a block diagram of one embodiment of a computer system.

FIG. 1 is a block diagram of one embodiment of a computer system. The computer system may include a processor 100, a memory controller hub (MCH) 102, and an I/O controller hub (ICH) 108. The MCH 102 and the ICH 108 may comprise a chipset. The processor 100 may be coupled to the MCH 102 via a host bus. The MCH 102 may be coupled to system memory 104. In different embodiments, system memory may be synchronous dynamic random access memory (SDRAM), double data rate SDRAM (DDR-SDRAM), Rambus DRAM (RDRAM), or one of many other formats of main system memory. The MCH 102 may also be coupled to a graphics module 106. In one embodiment, a graphics module may be an accelerated graphics port (AGP) graphics card. ICH 108 may be coupled to an I/O bus 110, a hard drive 112, a keyboard controller 114, and a mouse controller 116. In different embodiments, the ICH 108 may also be coupled to any number of I/O devices, buses, and/or controllers such as a Redundant Array of Independent Disks (RAID) controller, a Peripheral Component Interface (PCI) bus, or a Universal Serial Bus (USB), among many others. In another embodiment, the ICH 108 may also have a number of internal features such as internal high definition audio capabilities and power management features for use on mobile platforms to conserve battery life.

In one embodiment, the ICH 108 may have a programmable feature permission designator (FPD) 118 used to determine if a feature is permitted to be enabled during system initialization. In one embodiment, the FPD may be a one-bit value in a register that is located within the ICH 108. In one embodiment, the one-bit FPD value in the register is only programmable once and thereafter is hard-wired permanently to the programmed value. In this embodiment, the value may be hard-wired upon programming by coupling a fuse to the register bit line (with an associated bit-value) and either allowing the fuse to remain closed or opening the fuse depending on the desired bit value during initial programming.

In one embodiment, if the bit value associated with the FPD 118 is permanently programmed to be de-selected (i.e. permission to enable the feature is prohibited), the feature associated with the FPD 118 is permanently disabled. Otherwise, in this embodiment, if the bit value associated with the FPD 118 is permanently programmed to be selected (i.e. permission to enable the feature is granted), the feature associated with the FPD 118 may be enabled during subsequent system initializations. In one embodiment, if the feature is selected by the FPD 118, the feature may be enabled upon booting the system after a power down event. In another embodiment, if the feature is selected, the feature may be enabled only upon initialization after the battery backup that keeps the real-time clock functioning is disabled. In different embodiments, the ICH 108 may have a feature enable register (FER) 120 that is programmed by the Basic Input/Output System (BIOS), software, or other programming mechanisms during system boot to enable each feature. In one embodiment, a hardware strap may permanently program the FER 120 with a value. A hardware strap is a bit signal transmitted on a pin within the device that sets certain bits in the hardware based on the logical value of the bit signal at a certain time during initialization (i.e. during boot up).

In one embodiment, each feature is associated with one bit within the FER 120. In another embodiment, certain features are associated with multiple bits within the FER 120 to allow for multiple levels of functionality per feature. In one embodiment, there are multiple features associated with the ICH 108.

In this embodiment, each FPD 118 value is stored within a FPD 118 register and the FER 120 has corresponding bits (and associated values) for each FPD 118 value. A feature selection mechanism then compares the FPD 118 values with the FER 120 values to determine which features are selected and subsequently enabled in the system. Thus, if the FPD 118 value for a particular feature is selected (i.e. permitted to be enabled), then the corresponding FER 120 value for that same feature may be modified during system initialization to enable the feature. Accordingly, in one embodiment, the feature is enabled if the FPD 118 value and the corresponding FER 120 value are both logical one bit values. The FPD 118 and FER 120 logic circuitry within the ICH 108 will be referred to as a software feature selector (SFS) because of its ability to enable and disable each feature during system initialization by using BIOS, software, or other programming mechanisms.

Figure 2:
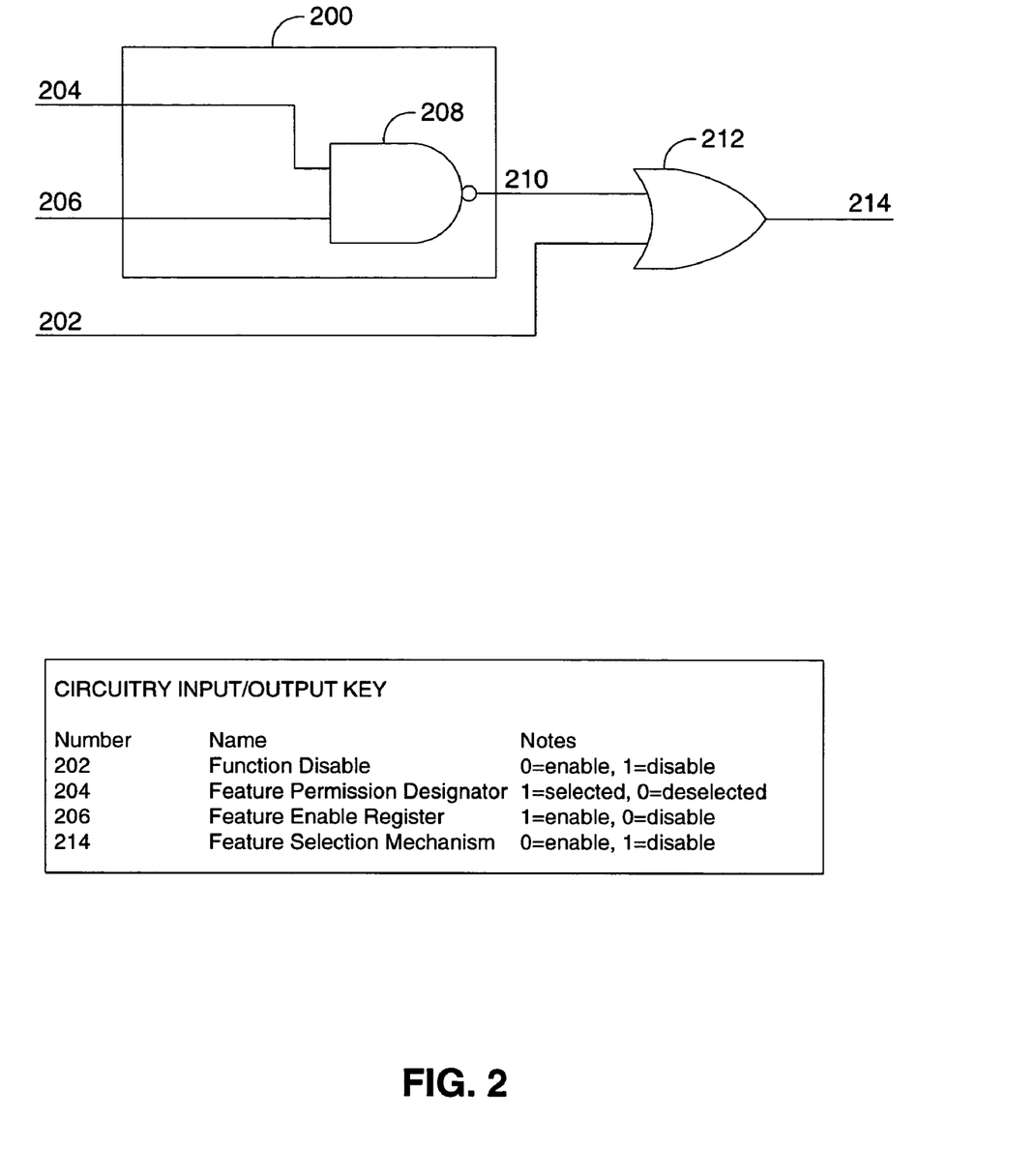
FIG. 2 is a circuitry diagram of an embodiment of a feature selection mechanism.

FIG. 2 is a circuitry diagram of an embodiment of a feature selection mechanism. Initially, the original function (i.e. feature) disable value (input 202) is input into a logical OR gate 212 to "OR" with the SFS output (output 210). Therefore, if the function disable value (input 202) is a logical one, the function is automatically disabled because the logical OR gate 212 will output a one.

Once the initial FPD programming (described above) has been completed, a specific FPD value (input 204) associated with a feature is input into the SFS 200. The FPD value (input 204) is input into the logical NAND gate 208 to "NAND" with a corresponding FER value (input 206). The FER value (input 206) may be modified during system initialization to enable or disable the feature. The SFS output (output 210) is input into the logical OR gate 212. Finally, the feature selection mechanism output value 214 is output from the logical OR gate 212. Thus, in this embodiment, the feature is enabled only if the FPD value (input 204) and the corresponding FER value (input 206) are both logical ones and the function disable value (input 202) is a logical zero. The results of the feature selection mechanism output value 214 are displayed in Table 1.

TABLE 1

Feature Selection Mechanism Results for FIG. 2 Embodiment

| 200—Function Disable Input Value (1 = Disabled, 0 = Enabled) | 202—Feature Permission Designator Input Value (1 = selected, 0 = deselected) | 204—Feature Selection Register Input Value (1 = enabled, 0 = disabled) | 210—Feature Selection Mechanism Output Value (1 = Disabled, 0 = Enabled) |
| --- | --- | --- | --- |
| 0 | 0 | 0 | 1 |
| 0 | 0 | 1 | 1 |
| 0 | 1 | 0 | 1 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1 |

Figure 3:
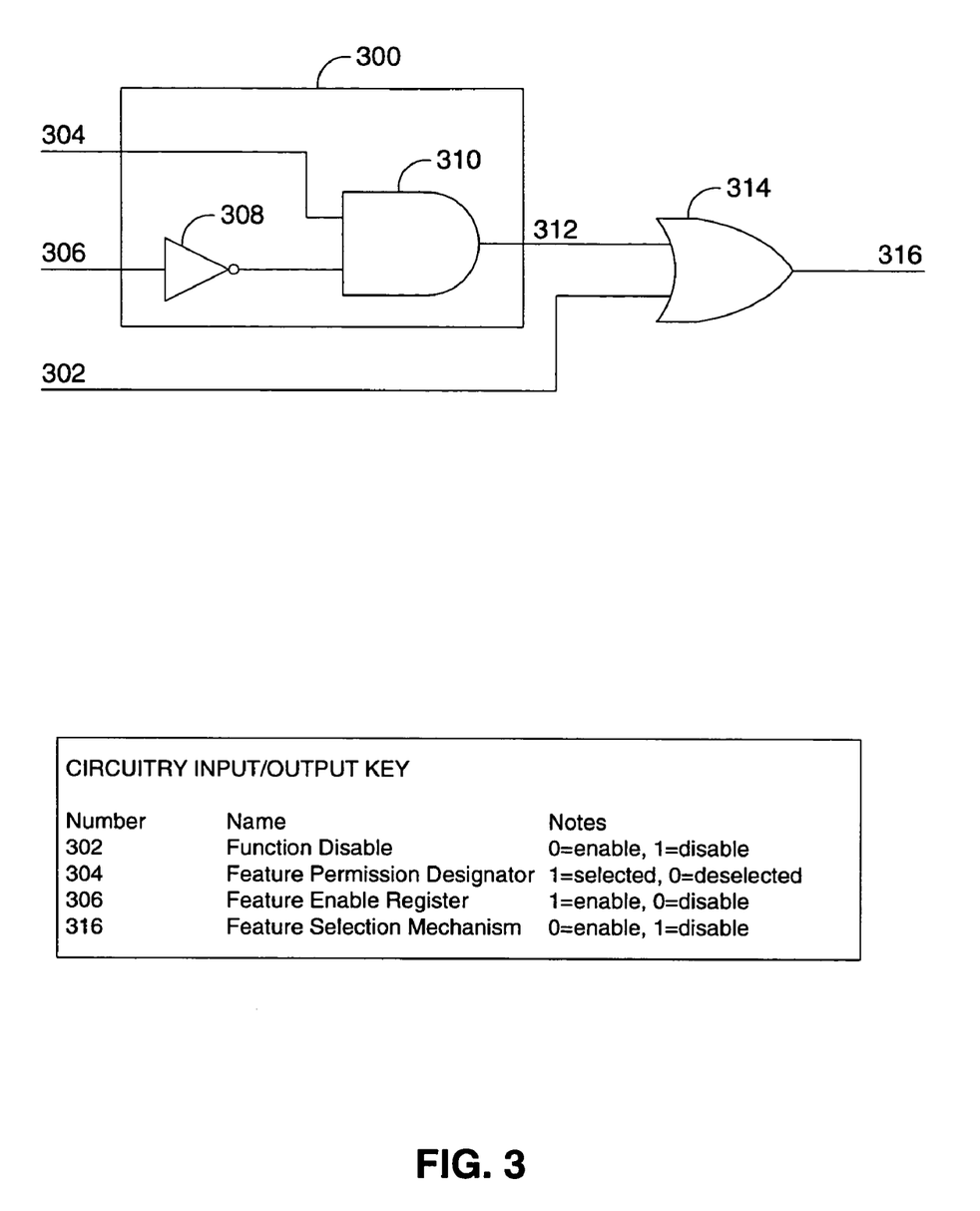
FIG. 3 is a circuitry diagram of another embodiment of the feature selection mechanism.

FIG. 3 is a circuitry diagram of another embodiment of the feature selection mechanism. In this embodiment, the FPD value (input 304) that is input into the SFS 300 determines whether the SFS 300 is enabled or disabled. Initially, the original function (i.e. feature) disable value (input 302) is input into a logical OR gate 314 to "OR" with the SFS output (output 312). Therefore, if the function disable value (input 302) is a logical one, the function is automatically disabled because the logical OR gate 314 will output a one.

Once the initial FPD programming (described above) has been completed, a specific FPD value (input 304) associated with a feature is input into the SFS 300. The FPD value (input 304) is input into the logical AND gate 310 to "AND" with a corresponding FER value (input 306), which is inverted by inverter 308. The FER value (input 306) may be modified during system initialization to enable or disable the feature. The SFS output (output 312) is input into the logical OR gate 314. Finally, the feature selection mechanism output value 316 is output from the logical OR gate 314. As mentioned above, in this embodiment, the SFS 300 is effectively enabled and disabled by the FPD value (input 304). Thus, if the FPD value (input 304) is input as a logical zero the SFS 300 is disabled and the function disable value (input 302) then controls whether the associated feature is enabled or disabled. The results of the feature selection mechanism output value 316 are displayed in Table 2.

TABLE 2

Feature Selection Mechanism Results for FIG. 3 Embodiment

| 300—Function Disable Input Value (1 = Disabled, 0 = Enabled) | 302—Feature Permission Designator Input Value (1 = selected, 0 = deselected) | 304—Feature Selection Register Input Value (1 = enabled, 0 = disabled) | 310—Feature Selection Mechanism Output Value (1 = Disabled, 0 = Enabled) |
| --- | --- | --- | --- |
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 1 |
| 1 | 1 | 0 | 1 |
| 1 | 1 | 1 | 1 |

Returning to FIG. 1, in one embodiment, the ICH 108 may have a programmable feature count designator (FCD) field 122. In this embodiment, the FCD 122 may be set to a numerical value that equals the greatest number of features the ICH 108 may have concurrently enabled. In one embodiment, the FCD 122 may be represented by a numerical value located in a register with the ICH 108. In one embodiment, the numerical value in the register is only programmable once and thereafter is hard-wired permanently to the programmed value. In one embodiment, the value may be hard-wired upon programming by coupling a fuse to each register bit line (each with an associated bit-value) and either allowing the fuse to remain closed or opening the fuse depending on the desired bit value during initial programming of the register. In one embodiment, the FCD 122 value may be a 3-bit value that can represent a feature count from zero to seven. In other embodiments, the FCD 122 value will equal the number of bits necessary to enable the FCD value to count all features associated with the ICH 108.

The FCD 122 value may be utilized to limit the number of features selected on the ICH 108 in one embodiment. Thus, in this embodiment, during system initialization the FCD 122 value is compared to the total number of selected features (i.e. the number of FPD values at a logical one) and if the total number of selected features is greater than the FCD 122 value, all features are disabled. In another embodiment, during system initialization the FCD 122 value is compared to the total number of enabled features (i.e. the number of FER 120 bits at a logical one) and if the total number of enabled features is greater than the FCD 122 value, all features are disabled. In this embodiment, the system may be initially programmed to permit all features (i.e. have all features selected by initially programming every FPD value to a logical one) and then limit the number of features that are enabled for each subsequent system initialization. For example, if the ICH 108 had three permitted features (RAID, SCSI, and USB) and the FCD 122 value was hard-wired to a numerical value of two, then on system initialization two of the three features could be selected (i.e. RAID and SCSI, RAID and USB, or SCSI and USB) but not all three. Therefore, it is possible in this embodiment to allow custom programming during system initialization, but still allow for disabling all features if the permitted feature count is exceeded.

In another embodiment, during system initialization the FCD 122 value is compared to the total number of enabled features (i.e. the number of FER 120 bits at a logical one) and if the total number of enabled features is greater than the FCD 122 value, a number of features will be disabled that will cause the total number of FER 120 bits to be less than or equal to the FCD 122 value. In one embodiment, the set of features in the ICH 108 are prioritized and are disabled in a priority order.

In one embodiment, a feature may be associated with more than one FER 120 bit value. In this embodiment, different features on the ICH 108 may be valued differently. For example, the RAID feature could be worth twice as much in value as the SCSI feature. Therefore, whereas the SCSI feature may have one associated FER 120 bit, the RAID feature may have two separate FER 120 bits associated with it. In this embodiment, the number of FER 120 bits associated with each feature give the feature a certain feature credit value. Thus, in this embodiment, during system initialization the total number of credits associated with all enabled features are summed and that value is compared to the FCD 122 value. If the total number of credits is greater than the FCD 122 value, all features are disabled. In another embodiment, if the total number of credits is greater than the FCD 122 value, one or more features are disabled.

Figure 4:
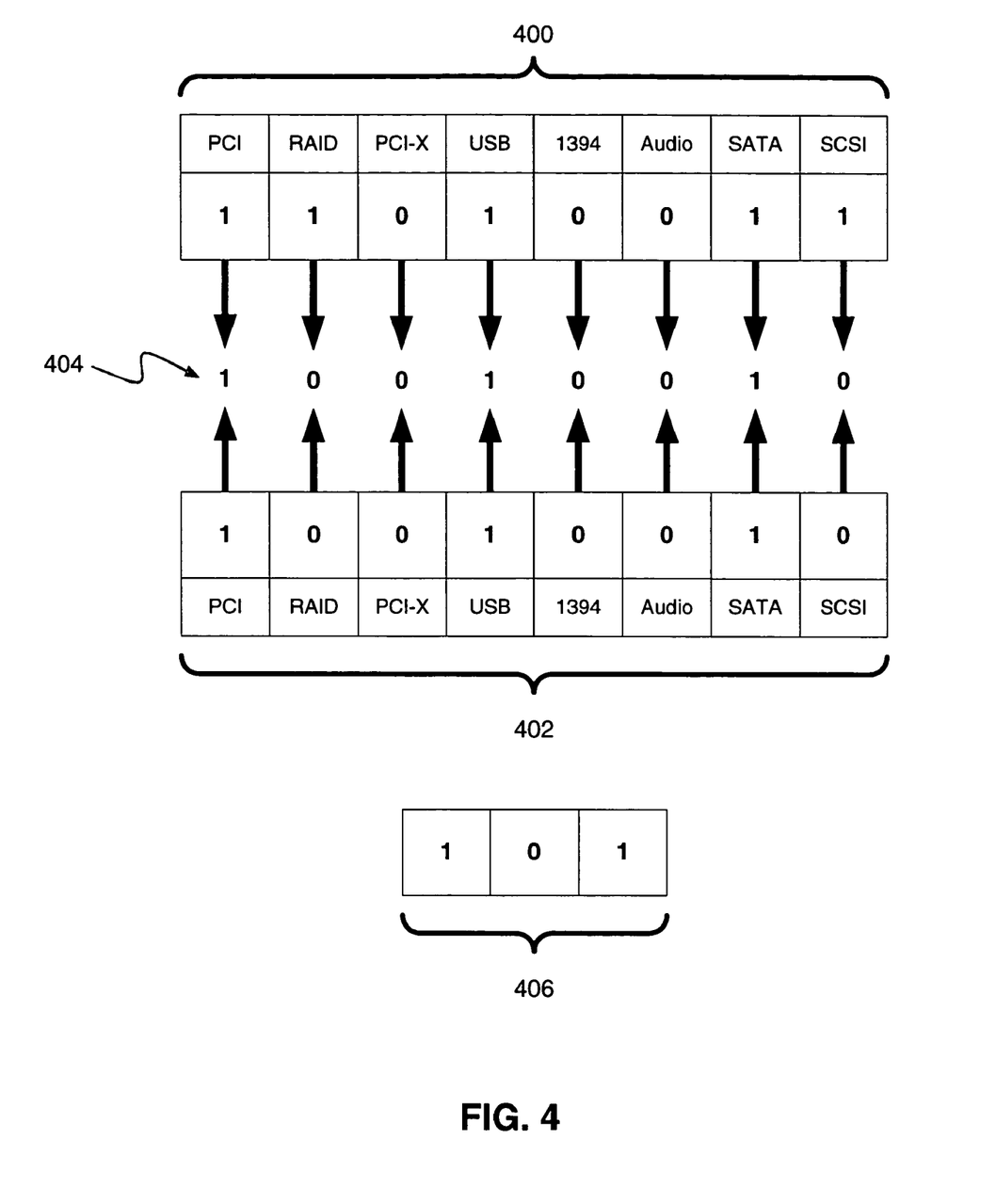
FIG. 4 is an example of the results of the feature selection mechanism in one embodiment.

FIG. 4 is an example of the results of the feature selection mechanism in one embodiment. The FPD register 400 that stores the FPD bit values may be permanently programmed to select certain features that may subsequently be enabled by the FER 402. The features that are enabled have been "selected" (i.e. a logical one value in the FPD bit) and "enabled" (i.e. a logical one value in the FER bit). Thus, in this example, the features that are enabled are PCI, USB, and Serial Advance Technology Attachment (SATA), which are represented by the logical ones in the result row 404. Additionally, the FCD 406 is represented by 3-bit value. In this example the 3-bit value is a binary 1-0-1 or five in decimal. Thus, the features remain enabled for both FCD embodiments (described above) because neither the FPD register 400 nor the FER 402 has a number of logical one bits greater than five.

Figure 5:
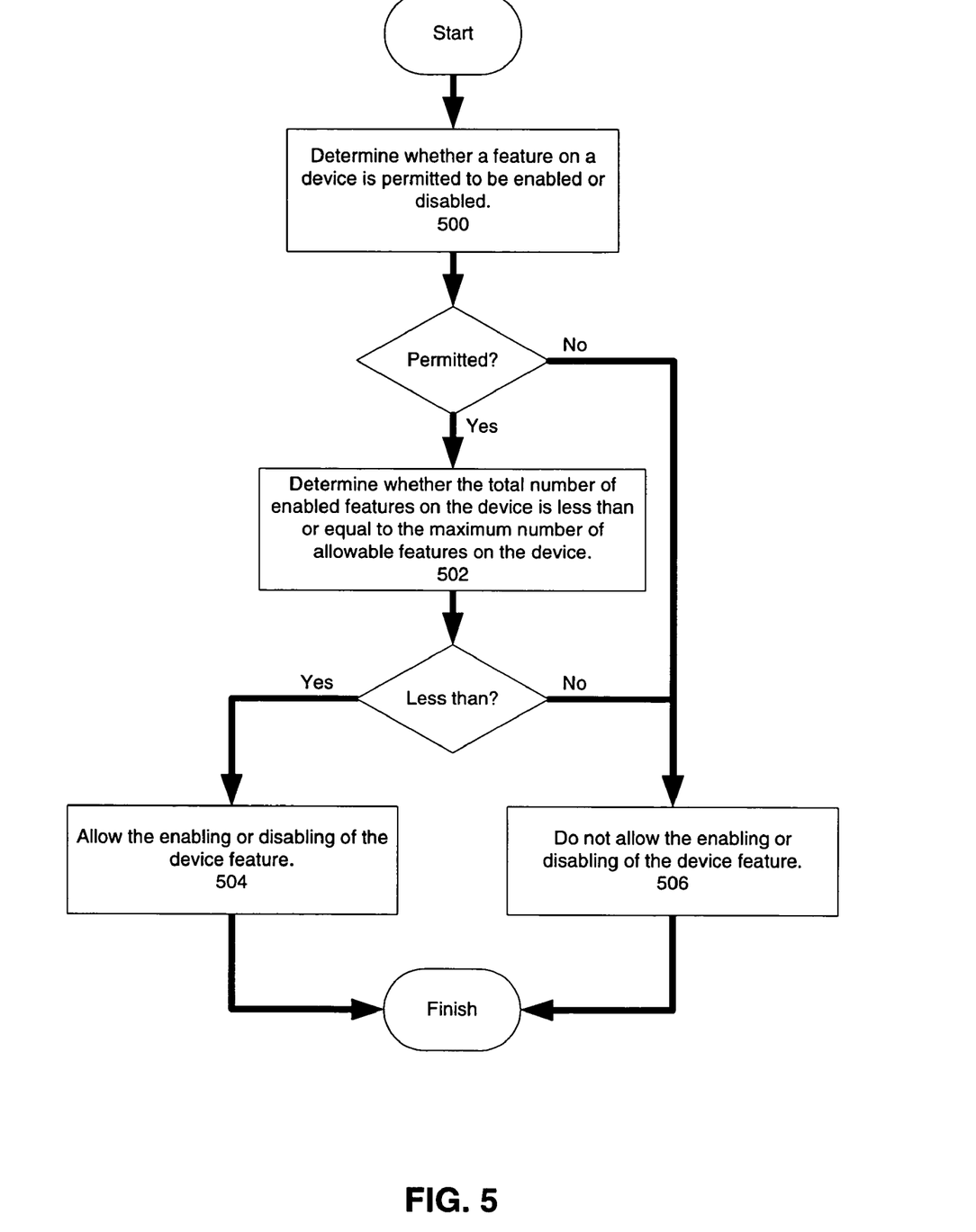
FIG. 5 is a flow diagram of one embodiment of a process for enabling features on a device.

FIG. 5 is a flow diagram of one embodiment of a process for enabling features on a device. The process is performed by processing logic that may comprise hardware (circuitry, dedicated logic, etc.), software (such as is run on a general purpose computer system or a dedicated machine), or a combination of both. Referring to FIG. 5, the process begins by processing logic determining whether a feature on a device is permitted to be enabled or disabled (processing block 500). Next, if processing logic determines that the feature is not permitted to be enabled or disabled, then processing logic does not allow (i.e. prohibits) the enabling or disabling of the device feature (processing block 506). Otherwise, if processing logic determines that the feature is permitted to be enabled or disabled, then processing logic determines whether the total number of enabled features on the device is less than the maximum number of allowable features on the device (processing block 502). If processing logic determines that the total number of enabled features on the device is greater than the maximum number of allowable features on the device, then processing logic does not allow the enabling or disabling of the device feature (processing block 506). Otherwise, if processing logic determines that the total number of enabled features on the device is less than the maximum number of allowable features on the device, then processing logic allows the enabling or disabling of the device feature (processing block 504).

Figure 6:
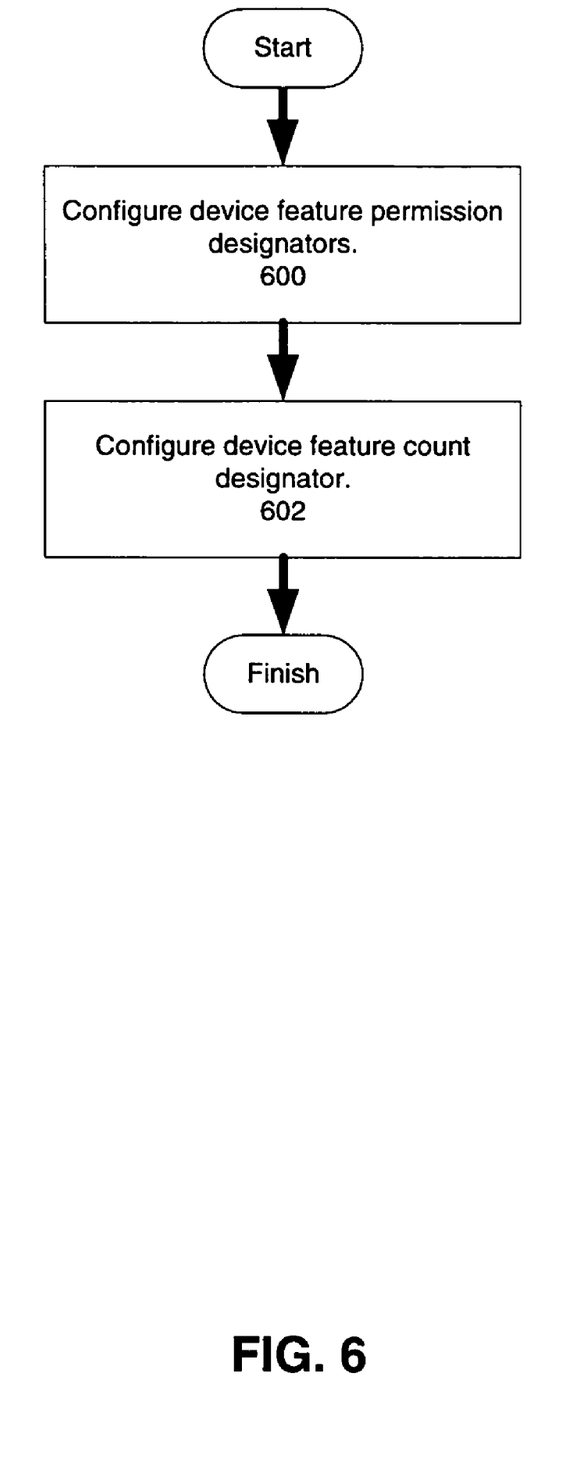
FIG. 6 is a flow diagram of one embodiment of a process for initially configuring a device to allow feature enabling.

FIG. 6 is a flow diagram of one embodiment of a process for initially programming a device to allow feature enabling. The process is performed by processing logic that may comprise hardware (circuitry, dedicated logic, etc.), software (such as is run on a general purpose computer system or a dedicated machine), or a combination of both. Referring to FIG. 6, the process begins by processing logic programming the device's FPDs (processing block 600). In one embodiment, each FPD is associated with one device feature. If the FPD value is a logical one, processing logic permits the associated device to be enabled. Otherwise, if the FPD value is a logical zero, processing logic prohibits the associated device from being enabled. In one embodiment, the FPD value is only programmable once and thereafter is hard-wired permanently to the programmed value.

The process continues by processing logic programming the device's FCD (processing block 602). In one embodiment, the FCD may be set to a numerical value that equals the greatest number of features the device may have concurrently enabled. In one embodiment, the numerical value in the register is only programmable once and thereafter is hard-wired permanently to the programmed value.

Figure 7:
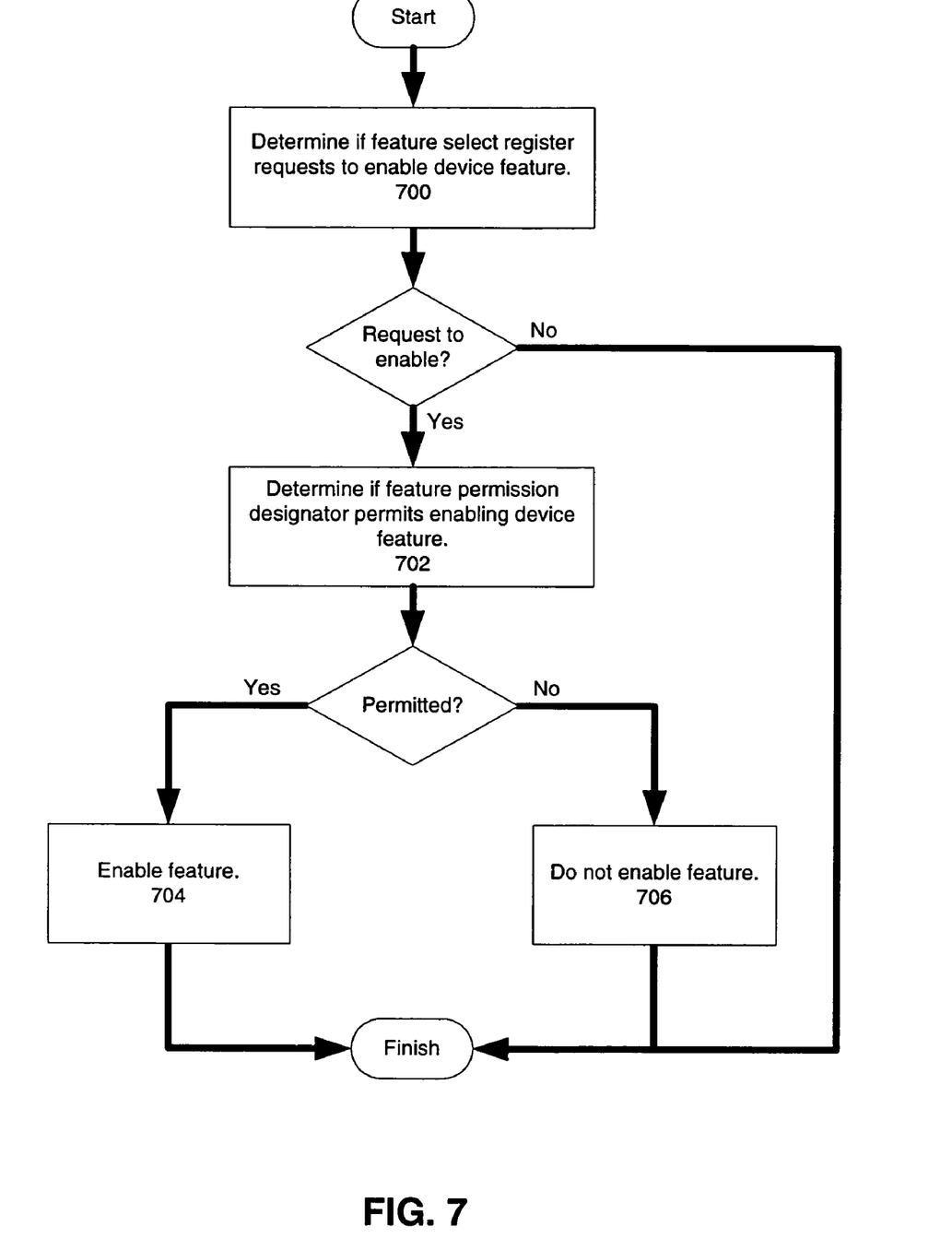
FIG. 7 is a flow diagram of an embodiment of a process for enabling a feature on a device utilizing the feature select register and the feature permission designator.

FIG. 7 is a flow diagram of an embodiment of a process for enabling a feature on a device utilizing the feature enable register (FER) and the feature permission designator (FPD). The process is performed by processing logic that may comprise hardware (circuitry, dedicated logic, etc.), software (such as is run on a general purpose computer system or a dedicated machine), or a combination of both. Referring to FIG. 7, the process begins by processing logic determining if the FER requests to enable the device feature in question (processing block 700). In one embodiment, processing logic determines whether value at the bit position in the FER associated with the device feature in question is a logical one or a logical zero. If the value is a logical zero, then there is no request to enable the feature and the process is finished. Otherwise, if the value is a logical one, then processing logic determines if the FPD permits enabling the device feature (processing block 702). In one embodiment, processing logic determines whether the value of the FPD associated with the device feature in question is a logical one or logical zero. If the value is a logical one, processing logic enables the device feature (processing block 704). Otherwise, if the value is a logical zero, processing logic does not enable the device feature (processing block 706).

Figure 8:
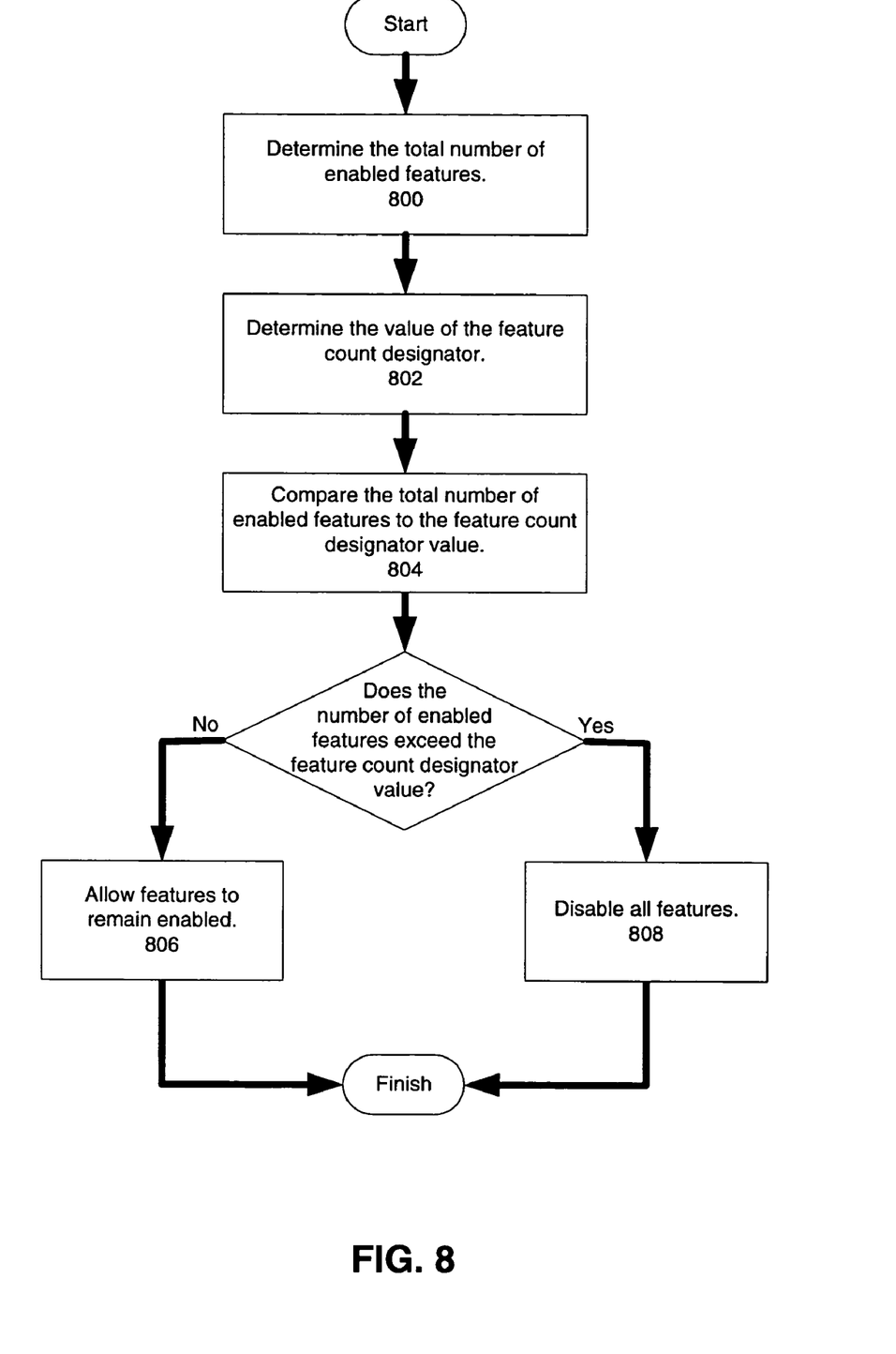
FIG. 8 is a flow diagram of an embodiment of a process for determining whether the device feature count has exceeded the maximum allowable feature count.

FIG. 8 is a flow diagram of an embodiment of a process for determining whether the device feature count has exceeded the maximum allowable feature count. The process is performed by processing logic that may comprise hardware (circuitry, dedicated logic, etc.), software (such as is run on a general purpose computer system or a dedicated machine), or a combination of both. Referring to FIG. 8, the process begins by processing logic determining the total number of enabled features on the device (processing block 800). Next, the process continues by processing logic determining the value of the FCD (processing block 802).

Processing logic then compares the total number of enabled features to the FCD value (processing block 804). If the total number of enabled features does not exceed the FCD value, processing logic allows the features to remain enabled (processing block 806). Otherwise, if the total number of enabled features does exceed the FCD value, processing logic disables all the features (processing block 808).

Many of the embodiments referred to above utilize an ICH as an example for the device in question. Although, the device referred to in the above embodiments may be any type of device that has modifiable features such as an MCH, a processor, or any other type of integrated circuit device. Additionally, in certain embodiments the FPD, FSR, and FCD values are not stored on the device with the modifiable features. In certain embodiments, the FPD, FSR, and FCD values are stored on a second device or in non-volatile storage within the system where the device in question is located.

Thus, embodiments of an effective programmable feature selection mechanism are disclosed. These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    checking a feature permission register for a device to determine whether a feature on the device is permitted to be enabled;
    determining whether a current count of enabled features on the device is less than a maximum number of allowable features on the device, the maximum number of allowable features on the device being a value programmed into a feature count designator register for the device; and
    associating each device feature with one or more credit values;
    adding the associated one or more credit values of all enabled device features; and
    allowing the enabling of the device feature if the device feature is permitted to be enabled, the total number of enabled features on the device is less than the maximum number of allowable features on the device, and the sum of the credit values of all enabled device features is less than the maximum number of allowable credit values,
    wherein the feature permission register and the feature count designator register are programmable only once and thereafter permanently hard-wired with their respective values.

2. The method of claim 1, further comprising programming the device with permanent values in the feature permission register and feature count designator register during a first device initialization boot sequence.

3. The method of claim 1, wherein each feature associated with the device has a designated bit in the feature permission register, the value of the bit indicating whether the feature is permitted to be enabled.

4. The method of claim 1, further comprising:
    disabling at least one currently enabled device feature when the current count of enabled features exceeds the maximum allowable number of features value in the feature count designator register.

5. The method of claim 4, wherein disabling at least one currently enabled device feature further comprises disabling all device features.

6. The method of claim 1, wherein the device further comprises an I/O controller hub.

7. The method of claim 1, wherein the device further comprises a memory controller hub.

8. The method of claim 1, wherein the device further comprises a central processing unit.

* * * * *

UNITED STATES PATENT AND TRADEMARK OFFICE
CERTIFICATE OF CORRECTION

PATENT NO. : 7,636,795 B2  Page 1 of 1
APPLICATION NO. : 10/883518
DATED : December 22, 2009
INVENTOR(S) : Hess et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this

Twenty-first Day of December, 2010

David J. Kappos
*Director of the United States Patent and Trademark Office*